United States Patent [19]

Kawada

[11] Patent Number: 5,516,328

[45] Date of Patent: May 14, 1996

[54] END SURFACE POLISHING MACHINE

[75] Inventor: Yasuo Kawada, Sendai, Japan

[73] Assignee: Seiko Electronic Components Ltd., Japan

[21] Appl. No.: 256,317

[22] PCT Filed: Oct. 27, 1993

[86] PCT No.: PCT/JP93/01552

§ 371 Date: Sep. 6, 1994

§ 102(e) Date: Sep. 6, 1994

[87] PCT Pub. No.: WO94/09944

PCT Pub. Date: May 11, 1994

[30] Foreign Application Priority Data

Oct. 27, 1992 [JP] Japan ..................... 4-288676

[51] Int. Cl.⁶ ..................................................... B24B 7/00
[52] U.S. Cl. ........................................... 451/259; 451/271
[58] Field of Search .................................... 451/259, 270, 451/271, 283, 291, 288, 278, 277, 284 R

[56] References Cited

U.S. PATENT DOCUMENTS 4,839,993  6/1989  Masuko et al. ..................... 451/271
4,979,334  12/1990  Takahashi ........................... 451/271
5,351,445  10/1994  Takahashi ........................... 451/271

Primary Examiner—Bruce M. Kisliuk
Assistant Examiner—Derris Banks
Attorney, Agent, or Firm—Adams & Wilks

[57] ABSTRACT

An end surface polishing machine comprises a holding disc for holding a plurality of ferrules supporting coaxially aligned optical fibers. A support mechanism supports the holding disc and places the end surfaces of the ferrules in contact with a polishing disc. A drive mechanism includes a rotation motor for rotating the polishing disc about a first axis, a revolution motor for revolving the polishing disc about a second axis, a first rotating disc rotatable about the first axis by the rotating motor, at least one second rotating disc disposed eccentrically on the first rotating disc, and a third rotating disc connected to the second rotating disc for rotation about the second axis. The revolution axle is supported for revolution around the first axis by the revolution motor and is provided with a through-hole defining a center axis extending along the second axis. A rotation axle is rotatably disposed within the through-hole and is connected at a first end to the third rotating disc and supports the polishing disc at a second end.

16 Claims, 5 Drawing Sheets

END SURFACE POLISHING MACHINE

FIELD OF THE INVENTION

This Invention pertains to a polishing device which polishes the ends of optical fiber-fixing ferrules, including the optical fiber ends, into convex rounded surfaces.

BACKGROUND OF THE INVENTION

The problem of increased noise occurs in high-speed transmission systems using laser diodes due to the back light reflected at the junction of optical connectors, that is, at the end surfaces of connected fibers. In order to reduce this reflection at the end surfaces, PC (physical contact) end surface formation technology, in which the ferrule end surface Is processed into a convex rounded surface with the fiber at the center, and in which the end surfaces are tightly connected without airgap when the fibers are connected, has been widely used.

In order to obtain a convex rounded surface, a polishing plate is constructed by gluing a thin polishing sheet onto the upper side of a flat polishing disc made of a soft elastic material. The end surface of the ferrule to be polished is pressed onto this polishing plate while being moved in a circular arc, whereby the polishing disc becomes deflected due to elastic deformation, and using this bending phenomenon, the ferrule and fiber end surfaces are simultaneously formed into a precise convex rounded surface.

On the other hand, because the mechanism for moving the sample and the polishing plate greatly affects both the accuracy of the finish of the end surface and the time required for the polishing, a lapping disc mechanism, which is a well-known device to polish parallel-flat processing objects, is used for the polishing plate. In other words, the ferrule, which is the processing object, is kept stationary while the polishing plate simultaneously revolves and rotates by means of a planetary gear and a drive motor, In this way, the ferrule is placed in contact with the polishing plate and a lapping movement which traces a uniform locus is obtained.

Consequently, the ferrule can be efficiently processed into a desired convex rounded surface with the fiber at the top.

As a conventional example, U.S. Pat. No. 4979334 for an 'Optical Fiber End-Face Polishing Device' by M. Takahashi, filed on Dec. 25, 1990, has been disclosed.

As shown in FIG. 6, this device has an eccentric disc 112 which revolves in a concentric circle of a rotating disc, This eccentric disc 112 has a planetary gear assembly 109, 114, 115 which transmits the rotation of a revolution motor, and the planetary gear is connected to the polishing disc 108 so that the polishing disc rotates as well as revolves.

In the above device, because a planetary gear is used for the revolving mechanism even if the revolution motor is stopped, when rotational energy is supplied to the rotational axis, the planetary gear continues to rotate while it engages with the revolution motor, and the polishing disc 118 subsequently ends up revolving. As a result, there are limitations in setting the optimal rates of rotation and revolution relative to the finishing level and processing time.

Further, multiple processing objects, such as optical fiber connectors or ferrules 133, fixed on a support plate 131 must face in a direction perpendicular to the polishing disc 118 to obtain the desired convex rounded surface with the fiber at the top. However, since the support plate 131 is affixed to a support table A via a pressure welding member S, a vertical setting error due to the fit between the pressure welding member S and the support plate 131 and a fixing screw 136 inevitably occurs, causing the ferrule's angle of contact to become slanted.

As a result, the finished surface of the ferrule deviates from the ideal convex rounded surface with the fiber center at the top, and the connection of the connectors is greatly affected.

Accordingly, in order to resolve the above problems with the conventional polishing devise, the object of the present invention is to obtain a polishing machine which can independently set the rates of rotation and revolution of the polishing disc and to introduce a polishing mechanism which can make the polishing object come into contact with the polishing disc in a proper fashion.

SUMMARY OF THE INVENTION

The main object of the present invention is a polishing machine which can process the end surfaces of ferrules into convex rounded surfaces with the fiber at the top with high accuracy in large quantities.

In the present invention, by applying the same processing pressure at all times to each of the ferrule end surfaces which are the polishing samples, and by keeping them stationary over and in contact with the polishing disc made of a soft elastic matedal having a polishing sheet on its upper side, as well as by equipping the device with a mechanism which causes the polishing disc to independently revolve and rotate, which together deflect the polishing disc in elastic deformation, each sample is processed into a convex rounded surface with the fiber at the top based on the bending phenomenon end a lapping movement In which the samples draw uniform loci. Specifically, the present invention provides a multiple end surface polishing machine equipped with multiple units each comprising a fixing disc which fixes elongated rod-like members such as fiber-fixing ferrules, a support mechanism which supports the fixing disc and places the rod-like members into contact in a perpendicular fashion with a polishing disc, and a polishing disc being equipped with a polishing member which polishes the rod-like members, wherein the polishing disc is equipped with a drive mechanism for independent rotation and revolution, in which in order to put the ferrules into contact with the polishing disc in a properly perpendicular fashion, the ferrule fixing disc is pressed down by a pinpoint bearing mechanism so that the ferrules are processed based on the polishing disc, the flatness of which is known in advance.

The above means has further improved the polishing finish and made it possible to mass-produce polishing machines capable of convex rounded surface processing using a simple method.

DETAILED DESCRIPTION OF PREFERRED EMBODIMENTS

Figure 1:
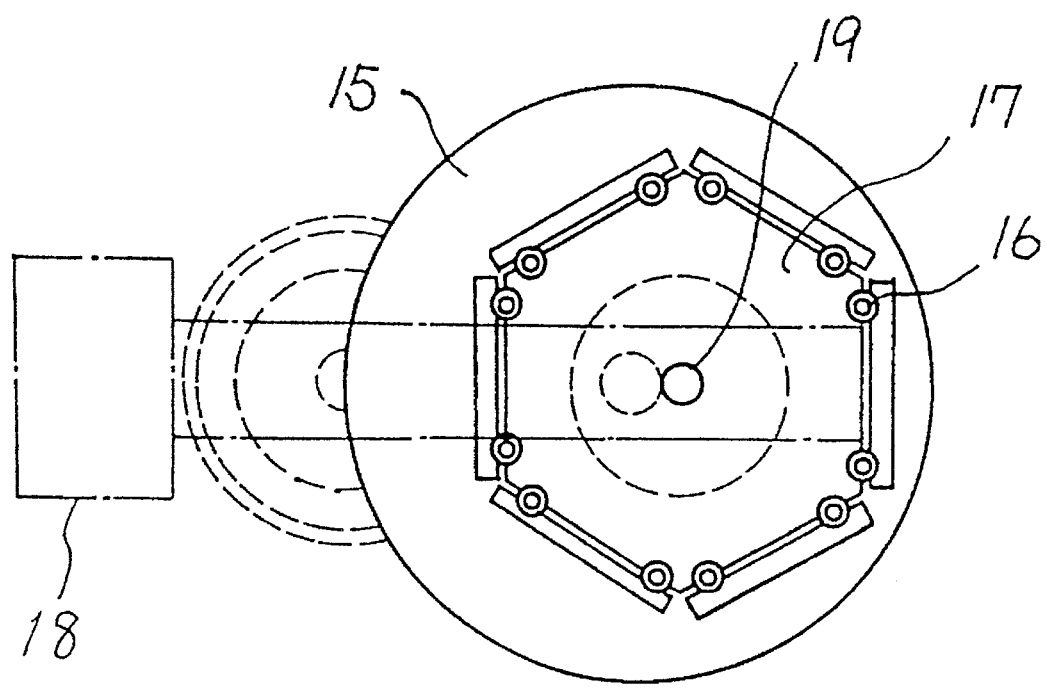
FIG. 1 is a plan view of the present invention.

An embodiment of the present invention, which is a single unit end surface polishing machine, is described with reference to FIGS. 1 through 5, FIGS. 1 and 2A are a plan view and a cross-sectional view of the present invention, respectively. First rotation transmission disc 2 which is made to rotate on its rotational axis Y via rotation motor 1 is fixed on the axle of motor 1, and first connecting pins 3 are fixed on a concentric circle around the rotational axis of the first rotation transmission disc 2. Second rotation transmission discs 4 rotatably inserted over the first connecting pins 3 have holes at the same eccentric locations, and second connecting pins 5 rotatably inserted so that each meets each hole is fixed on a third rotation transmission disc 6.

In addition, there is a revolution transmission axle 11 whose axis is centered along the rotational axis and which is guided by a bearing cylinder 10 via gears 8 and 9 which are made to rotate by a revolution motor 7. Revolution transmission axle, 11 has a support through-hole 12 at the location which provides the same level of eccentricity from the rotation center as the above-described rotation transmission discs. A rotation axle 13 is rotatably inserted in the support through-hole 12 and one end of it is fixed to the third rotation transmission disc 6 while the other end is connected to a polishing disc 15 via a connecting member 14.

Further, polishing disc 15 is made of a soft elastic material and has a polishing member (not shown in the drawing), and elongated rod-like members 16, such as ferrules whose ends are to be polished, are in contact with this polishing member. Rod-like members 16 are detachably affixed to a holding fixing disc 17 capable of supporting multiple samples, a member pressing the axle 19 presses the fixing disc 17 down, via a block portion 30 fixed to a central portion of the fixing disc, onto the polishing disc 15 a prescribed force. The fixing disc 17 is prevented from rotating by rotation stopping pin 20. There are multiple weights (not shown) such that any desired pressure can be selected for the support mechanism 18.

Figure 3:
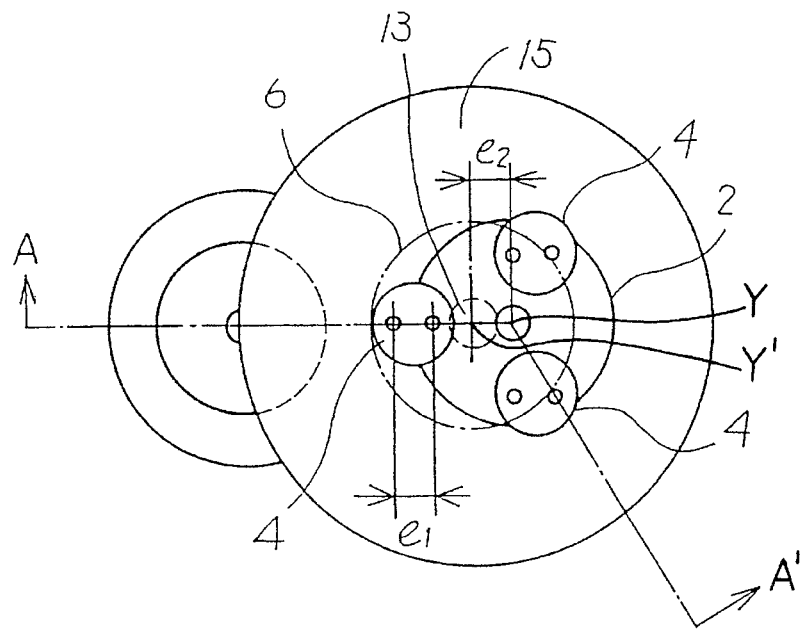
FIG. 3 is a plan view illustrating the operation of the present invention.
Figure 4:
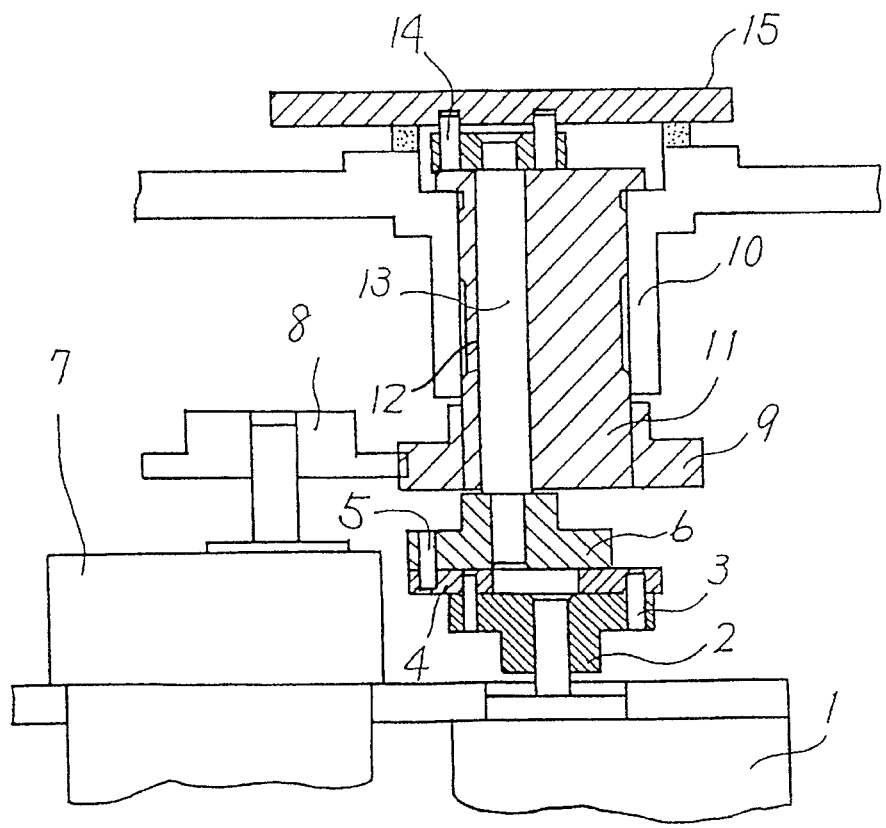
FIG. 4 is a cross-sectional view taken along line A—A' of FIG. 3.

Next, the operation of the present invention is described. FIG. 3 is a plan view illustrating the operation of the present Invention, and FIG. 4 is a cross-sectional view taken along of line A—A' of FIG. 3. First, with regard to the revolving movement, the revolution transmission axle 11 is made to rotate around the Y axis by means of revolution motor 7 via gears 8 and 9. When this happens, because the center of the polishing disc 15 is on the Y' axis spaced a distance $e_2$ away from the Y axis, the Y' axis moves around the Y axis with a radius of $e_2$. When this happens, although the rotation axle 13 resides in the revolution transmission axle 11, as shown in FIG. 3, because the second rotation transmission discs 4 have the same level of eccentricity as the level of eccentricity between the Y and Y' axes, i.e., $e_2$, the second rotation transmission discs 4 rotate around the first connecting pins 3 with the same phase as the rotation of revolution transmission axle 11. Therefore, whether the first rotation transmission disc 2 is still or rotating, the rotation of the revolution transmission axle 11 is not restricted.

On the other hand, with regard to rotational movement, the first rotation transmission disc 2 is made to rotate by the rotation motor 1. Because the connecting first pins 3 are located in a concentric circle outside the first rotation transmission disc 2, they pass through the same locus around the Y axis. The rotational axis of the rotation axle 13 deviates from the first rotation transmission axis by $e_2$, but because the second connecting pin 5 on a concentric circle of third rotation transmission disc 6 is connected via the second rotation transmission discs 4 while maintaining eccentricity level $e_1$, the same rate of rotation as the first rotation disc 2 is transmitted to the rotation axle 13.

Figure 5:
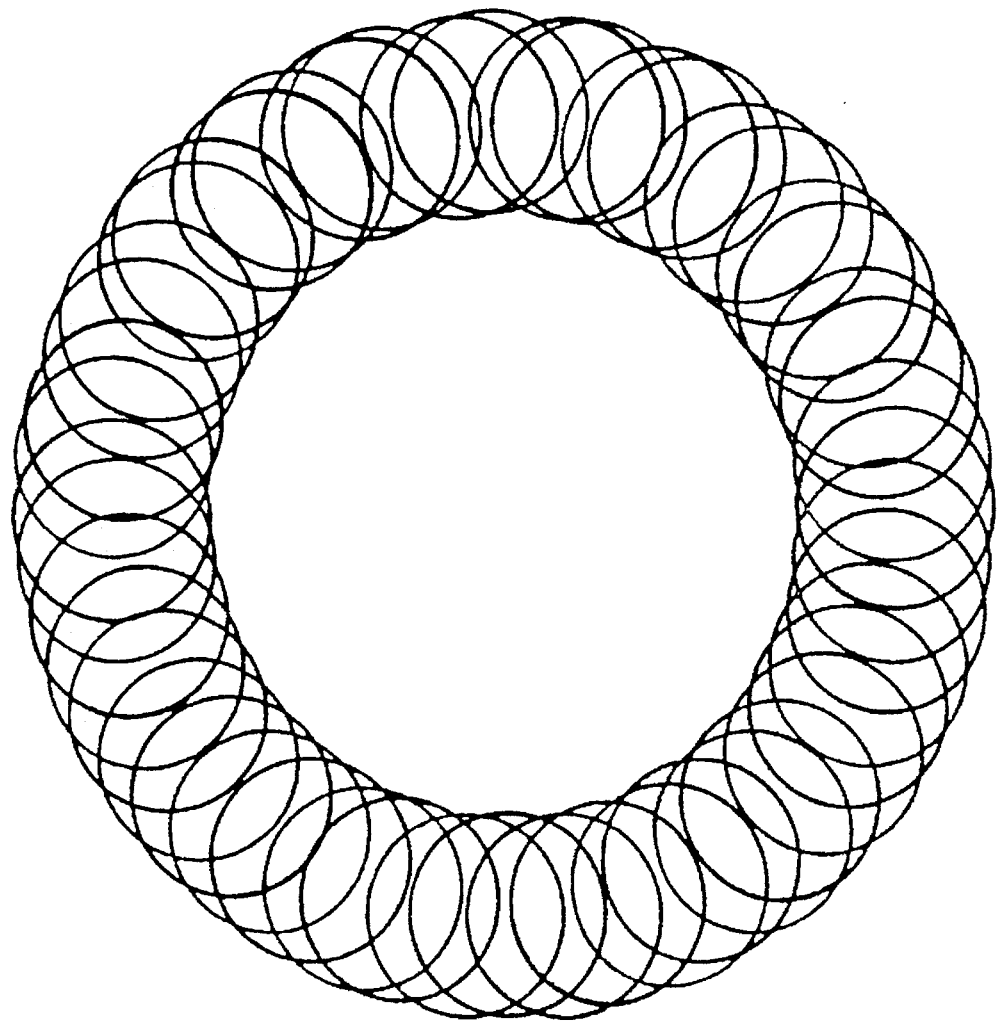
FIG. 5 is one example of the locus of contact points traced by a rod-like member on the polishing disc.
Figure 6:
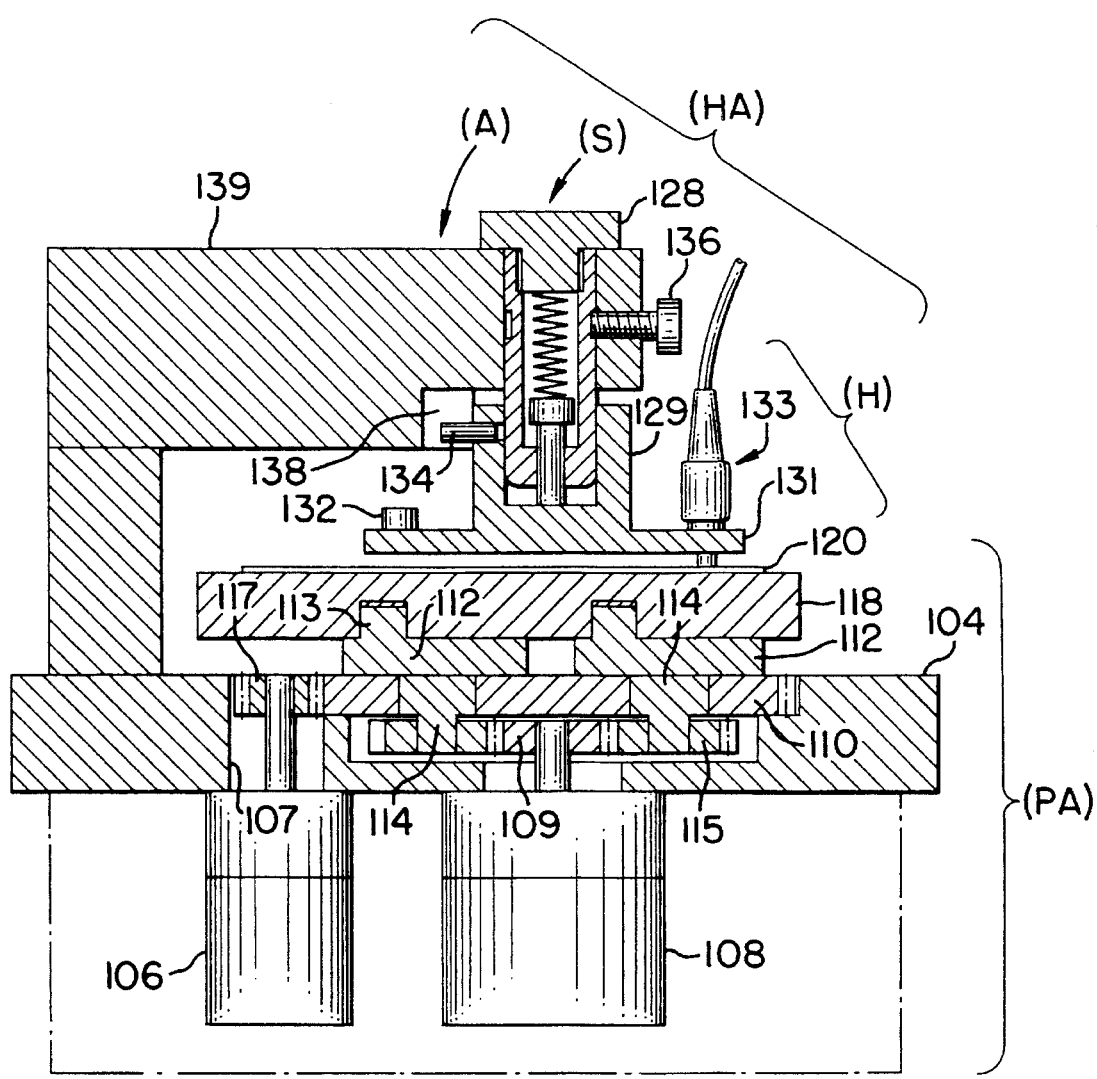
FIG. 6 shows the conventional art.

Incidentally, in light of the object of the present invention, the rate of rotation is much smaller than the rate of revolution. However, as described above, the setting of this rate can be independently performed both for rotation and revolution, posing no limitations. FIG. 5 shows one example of the locus of contact points left by the rod-like member 16 on the polishing disc 15, indicating that the polishing member is used effectively.

The curvature and eccentricity of the convex rounded surface, which are the most Important factors in the accuracy of the finish of the polished surface, are described below.

Figure 2B:
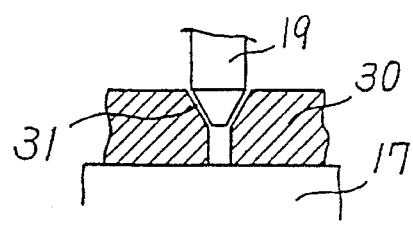
FIGS. 2&2B are is a cross-sectional view of the present invention.
Figure 2A:
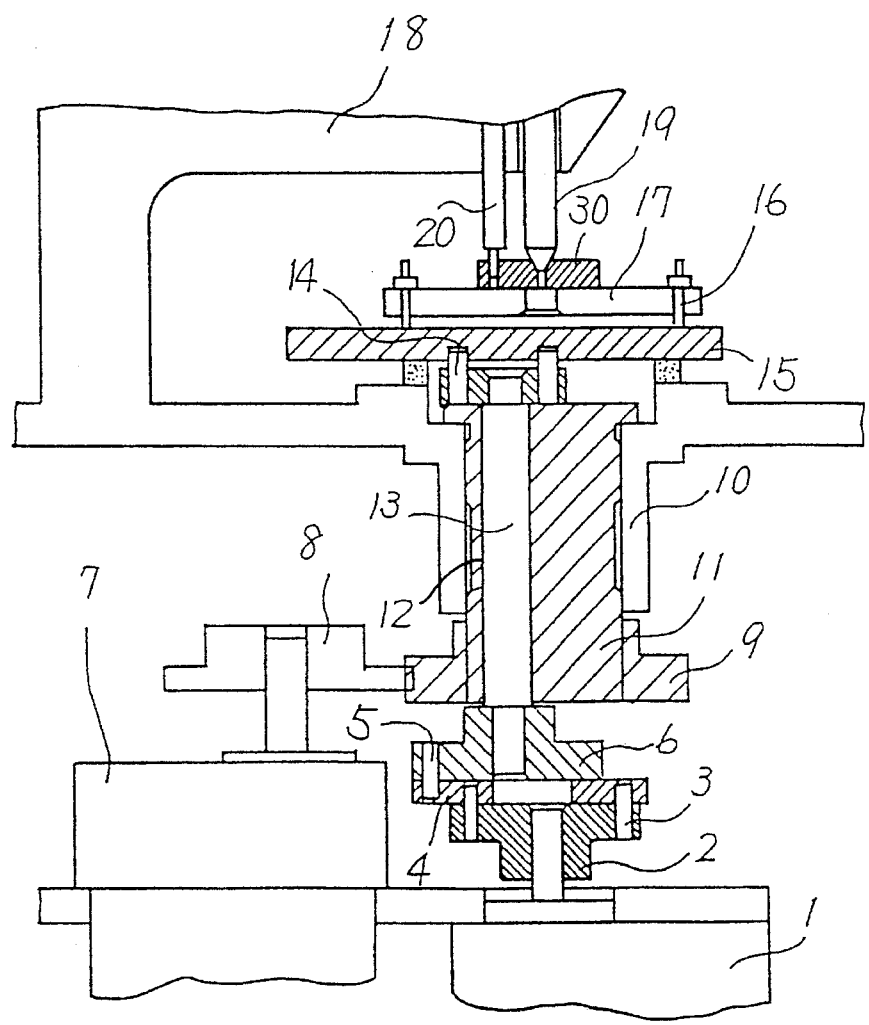

As shown in FIGS. 1 and 2A, 2B, by providing the pressing axle 19 which provides pressure and a tapered engagement hole 31 which engages with the pressing axle 19 at the center of the block portion 30 of the fixing disc 17 to which the ferrules 16 are attached, the polishing object (ferrule) can escape the mechanical imperfection factor unavoidable in the assembly of a polishing machine, in other words, the problem having to do with the parallel relationship between the polishing disc 15 and the ferrule support mechanism 18.

Further, when polishing objects (ferrules) of different lengths are attached to the support mechanism 17, the polishing objects come into contact with the polishing disc 15 in uneven lengths. When this happens, the pin pivot connection method described above functions to absorb the polishing movement resulting from the unevenness in length.

In addition to the above, the polishing objects attached to the fixing disc 17 are all located at the same distance from the center of the fixing disc 17.

Consequently, the polishing objects draw identical loci of movement in the final finish stage, which ensures a uniform finish.

It is understood that a multiple end surface polishing machine with multiple units having the above-described functions continuously connected on the same plane is also effective in polishing many polishing objects.

An important aspect of the present Invention is that easy processing of multiple polishing samples into the desired convex rounded surfaces with the fiber at the top is made possible by first having the ferrule end surfaces, the multiple polishing samples, kept stationary over and in contact with a polishing disc which is made of a .soft elastic material and has a polishing sheet glued to it, and by applying the same processing pressure to them at all times, as well as by having the samples trace uniform loci of contact points on the polishing disc in a lapping movement via a drive mechanism capable of Independently causing the polishing disc to rotate and revolve.

In addition, with regard to processing in large quantities, because the construction very often takes the form of a multiple end surface polishing machine equipped with multiple units, a considerable advantage can be obtained by having the multiple units perform the same processing simultaneously or by having each unit perform different processes such as rough polishing, finishing and refining polishing, Naturally, the radius of curvature is obviously selected by using a soft elastic material of the appropriate hardness, It is also obvious that in order to form a convex rounded surface on a slanted plane of the ferrule end, the object of the process can be achieved by setting the angle of the ferrule's attachment onto the ferrule support member to the desired angle in advance. The end surface polishing machine of the present Invention is optimal for the formation of convex rounded surfaces of fiber-fixing ferrules and has great industrial value.

I claim:

1. An end surface polishing machine comprising:

a polishing disc;

a drive mechanism for independently rotating and revolving the polishing disc;

a holding disc for holding a plurality of elongated members having end surfaces, the holding disc having a central tapered opening; and a support mechanism for supporting the holding disc and having a pressing member insertable in the tapered opening of the holding disc and engageable therewith to press the end surfaces of the elongated members against the polishing disc.

2. An end surface polishing machine as claimed in claim 1; wherein the drive mechanism comprises a rotation motor for rotating the polishing disc and a revolution motor for revolving the polishing disc.

3. An end surface polishing machine as claimed in claim 2; wherein the drive mechanism further comprises a first rotating disc rotatable about a first axis by the rotation motor, second rotating discs disposed eccentrically on the first rotating disc, the second rotating discs having substantially equal eccentricities, a third rotating disc connected to the second rotating discs for rotation therewith about a second axis, a revolution axle supported for revolution around the first axis by the revolution motor, the revolution axle having a through-hole defining a center axis extending along the second axis, and a rotation axle rotatably disposed within the through-hole, the rotation axle having a first end connected to the third rotating disc and a second end supporting the polishing disc.

4. An end surface polishing machine as claimed in claim 3; further comprising means defining first and second bearing holes in each of the second rotating discs, the first rotating disc including first connecting pins spaced radially from the first axis, each of the first connecting pins being disposed in a respective one of the first bearing holes, and the third rotating disc including second connecting pins spaced radially from the second axis, each of the second connecting pins being disposed in a respective one of the second bearing holes.

5. An end surface polishing machine as claimed in claim 4; wherein the first and second bearing holes of each of the second rotating discs are spaced a first distance from each other; and the center axis of the through-hole of the revolution axle is spaced a second distance from the first axis of the first rotating disc equal to said first distance.

6. An end surface polishing machine as claimed in claim 5; wherein the pressing member has a tapered portion for insertion in the tapered opening of the holding disc.

7. An end surface polishing machine as claimed in claim 5; wherein the elongated members comprise ferrules supporting coaxially aligned optical fibers.

8. An end surface polishing machine comprising:

a holding disc for holding a plurality of elongated members having end surfaces;

a polishing disc;

a support mechanism for supporting the holding disc and placing the end surfaces of the elongated members in contact with the polishing disc; and a drive mechanism including a rotation motor for rotating the polishing disc about a first axis, a revolution motor for revolving the polishing disc about a second axis, a first rotating disc rotatable about the first axis by the rotation motor, at least one second rotating disc disposed eccentrically on the first rotating disc, a third rotating disc connected to the second rotating disc for rotation about the second axis, a revolution axle supported for revolution around the first axis by the revolution motor and having a through-hole defining a center extending along the second axis, and a rotation axle rotatably disposed within the through-hole and having a first end connected to the third rotating disc and a second end supporting the polishing disc.

9. An end surface polishing machine as claimed in claim 8; further comprising means defining at least first and second bearing holes in the second rotating disc, the first rotating disc having at least one connecting pin spaced radially from the first axis and disposed in the first bearing hole, the third rotating disc having at least one connecting pin spaced radially from the second axis and disposed in the second bearing hole.

10. An end surface polishing machine as claimed in claim 9; wherein the first and second bearing holes of the second rotating disc are spaced a first distance from each other; and the center axis of the through-hole of the revolution axle is spaced a second distance from the first axis equal to said first distance.

11. An end surface polishing machine as claimed in claim 10; wherein the elongated members comprise ferrules supporting coaxially aligned optical fibers.

12. An end surface polishing machine comprising: a polishing disc; a drive mechanism for rotating the polishing disc about a first axis and for revolving the polishing disc about a second axis; a holding disc for holding at least one elongated member having an end surface, the holding disc having a first central opening and a second opening, the first opening having a tapered surface, the first and second openings extending along the first axis; and a support mechanism for supporting the holding disc, the support mechanism including a pressing member insertable in the first opening of the holding disc and engageable therewith to press the end surface of the elongated member against the polishing disc, the pressing member having a tapered portion for engagement with the tapered surface of the first opening, and a stopper element insertable in the second opening of the holding disc to prevent rotation of the holding disc about the first axis.

13. An end surface polishing machine comprising: a polishing disc; a drive mechanism for rotating the polishing disc about a first axis and for revolving the polishing disc about a second axis, the drive mechanism having a rotation motor for rotating the polishing disc, a revolution motor for revolving the polishing disc, a first rotating disc rotatable about the first axis by the rotation motor, at least one second rotating disc disposed eccentrically on the first rotating disc, a third rotating disc connected to the second rotating disc for rotation about the second axis, a revolution axle supported for revolution around the first axis by the revolution motor and having a through-hole defining a center axis disposed along the second axis, and a rotation axle rotatably disposed within the through-hole and having a first end connected to the third rotating disc and a second end supporting the polishing disc; a holding disc for holding at least one elongated member having an end surface, the holding disc having a first central opening and a second opening, the first and second openings extending along the first axis; and a support mechanism for supporting the holding disc, the support mechanism including a pressing member insertable in the first opening of the holding disc and engageable therewith to press the end surface of the elongated member against the polishing disc, and a stopper element insertable in the second opening of the holding disc to prevent rotation of the holding disc about the first axis.

14. An end surface polishing machine as claimed in claim 13; further comprising means defining at least first and second bearing holes in the second rotating disc, the first rotating disc having at least one connecting pin spaced radially from the first axis and disposed in the first bearing hole, the third rotating disc having at least one connecting pin spaced radially from the second axis and disposed in the second bearing hole.

15. An end surface polishing machine as claimed in claim 14; wherein the first and second bearing holes of the second rotating disc are spaced a first distance from each other; and the center axis of the through-hole of the revolution axle is spaced a second distance from the first axis equal to said first distance.

16. An end surface polishing machine as claimed in claim 15; wherein the elongated member comprises a ferrule supporting a coaxially aligned optical fiber.

* * * * *